Dec. 31, 1935.  H. JOACHIM  2,026,232
SOUND-ON FILM RECORDING OR REPRODUCING APPARATUS
Filed Nov. 28, 1934    2 Sheets-Sheet 2
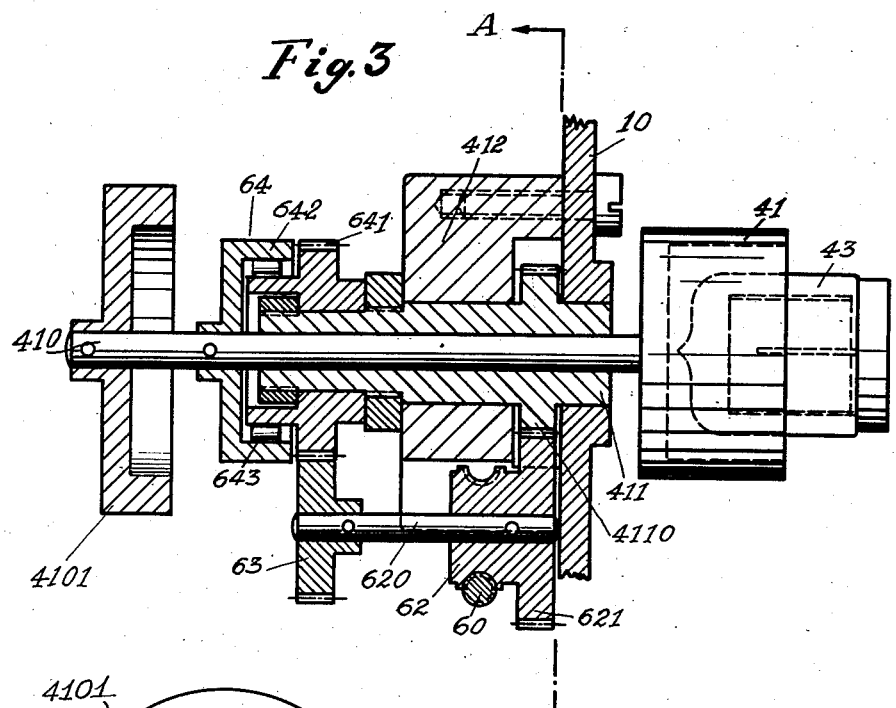
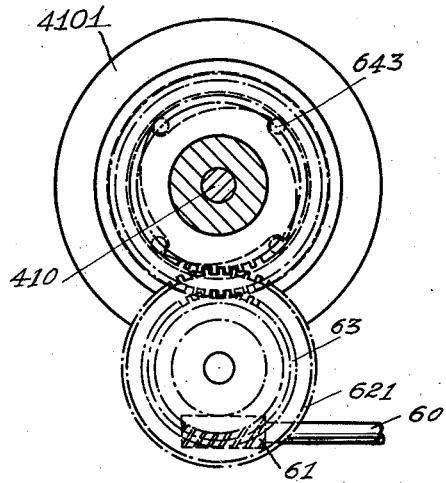
Inventor
Hermann Joachim

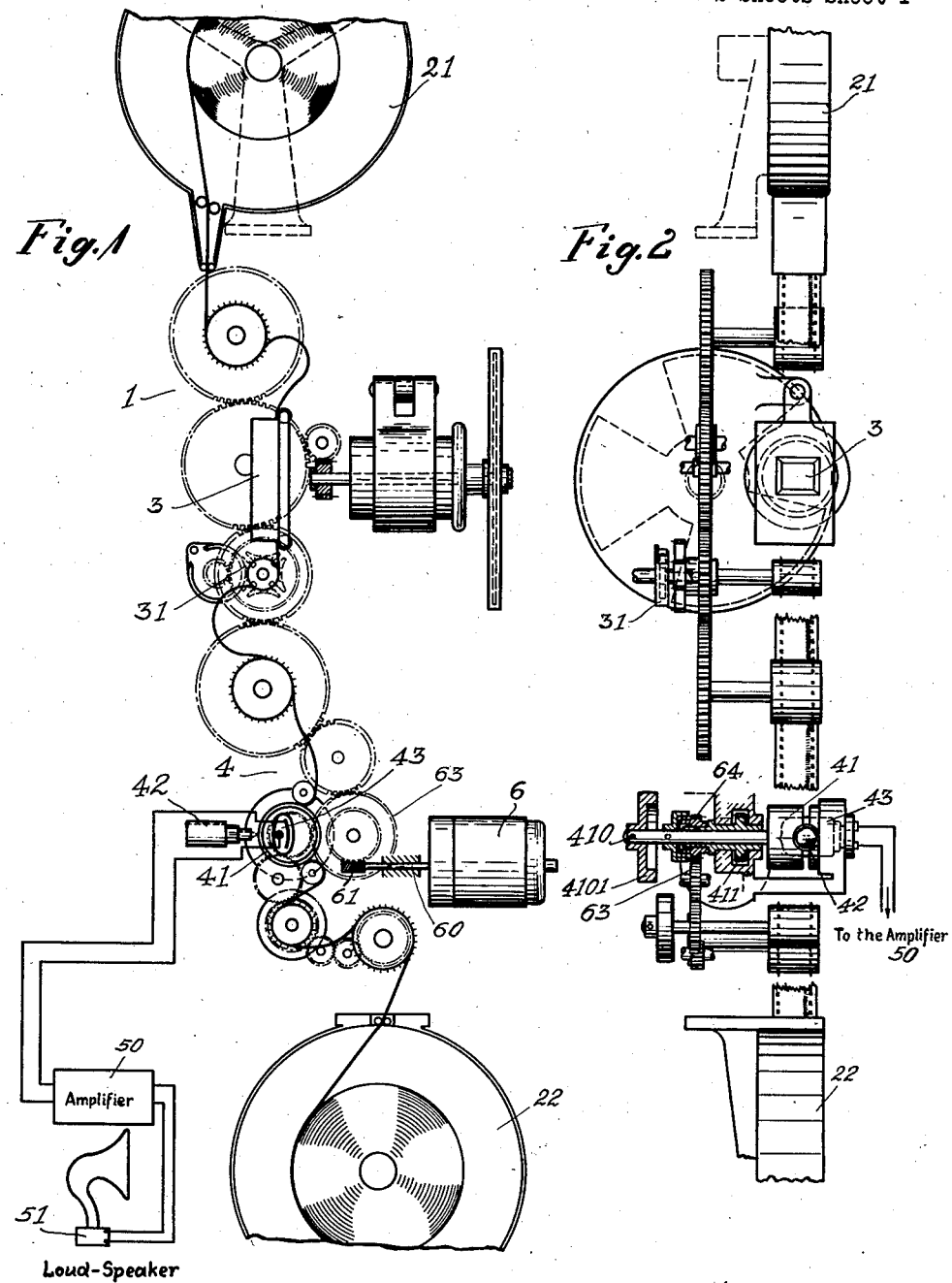

Patented Dec. 31, 1935

2,026,232

UNITED STATES PATENT OFFICE 2,026,232

SOUND-ON FILM RECORDING OR REPRODUCING APPARATUS

Hermann Joachim, Dresden, Germany, assignor to Zeiss Ikon Aktiengesellschaft, Dresden, Germany Application November 28, 1934, Serial No. 755,084
In Germany June 30, 1933

9 Claims. (Cl. 271—2.3)

The present invention relates to the method of photo-electrically recording or reproducing sound by record strips and particularly to the manner of driving the record strip through the recording or reproducing apparatus.

The object of the present invention will be easily understood from the following description taken in connection with the accompanying drawings, and its scope will be pointed out in the appended claims.

For illustrating the invention the principal arrangement is shown in connection with a talking motion picture projector. However, the invention is equally applicable to a machine for sound recording or reproducing only.

Figure 1 is a view in side elevation of a well-known form of a motion picture projector having mounted in connection therewith the sound head to which the present invention relates.

Figure 2 shows the same motion picture projector looking from the front the numerals being identical to those of Figure 1.

Figure 3 is an enlarged detailed view of the sound head per se, showing the interior mechanism.

Figure 4 is, in further detail, a cross sectional view of the driving mechanism of the bearing for the sound head, following line A—B of Figure 3.

For the sake of simplicity and to illustrate more clearly the features of the present invention, the projector is shown without the enclosing casing, the supports for the various parts of the apparatus, the light sources etc., the drawings containing only those parts which are most necessary to a clear understanding of the invention.

The motion picture projector 1 is of a common construction having the film storage reel 21 arranged above the picture and sound mechanism, and the film take-up reel 22 arranged below the mechanism.

The film is drawn through the gate 3 in a known manner with intermittent movement produced for example by the Geneva movement 31, the shutter being geared thereto to operate in proper timed relation with the movements of the film. The film after having passed the gate 3 runs to the sound reproducing mechanism 4 consisting of the sound head 41 by which the film is supported and moved with a uniform speed. By means of a suitable optical system 42 light from a source, not shown, is focused in a narrow beam on the film carrying the sound record, and on the opposite side of the film is the photo-electric cell 43. The modulated output of this cell passes in a known manner through an amplifier 50 to a loud speaker 51.

Sound head 41 is fixed to a shaft 410 to which the heavy flywheel 4101 is attached by which construction the necessary constancy of film speed is insured at that point at which the sound record is read off the film. This shaft is journalled in a bearing 411 mounted in the casing 10 of the projector 1. This arrangement is well-known and will not be claimed.

Normally the sound head and the flywheel connected therewith are frictionally driven by the film itself. Only in the beginning when the film starts to pass the projector the shaft 410 carrying the sound head 41 and the flywheel 4101 is directly driven by the main driving motor 6 of the projector. This is effected by suitable gears 61, 62, 63 and a coupling 64 fastened to the shaft 410. After the film has attained its normal speed the coupling 64 is broken and the sound head is only driven by the film itself.

Now it has been found that the flywheel is not at all able to damp out all vibrations transmitted from the driving mechanism to the sound head. This fact is due to a slight slippage between the film and the sound head originating from the friction of the shaft 410 in the bearing 411.

This disadvantage is wholly avoided by the present invention. It consists in the feature that any friction in the bearing of the shaft 410 is lessened to a minimum. This can be effected in the best manner by rotating the bearing 411 in the same sense and with the same or slightly different speed as the shaft 410 rotates.

In working out the chief idea of the present invention it has been found that very often the minimum of frictional resistance is effected by driving the bearing 411 with a speed which is slightly higher than that of the shaft 410 which is driven by the film. The difference is mostly very slight.

As experiments have shown, the speed difference depends on the size of the resistances which influence the speed of the shaft 410 in counteraction to the propelling force of the quicker rotating bearing 411. These counteraction resistances originate, for example, from the air resistance, the stickiness of the film, the pressure of rolls pressing the film against the sound head, etc. It will be easily understood that care must be taken not to drive the bearing 411 too quickly, otherwise the film instead of driving the sound head would be driven by it thus getting a higher speed at the sound head place than at the film driving sprocket at the gate. The result of it would be the fact that the film and loop normally existing between these both points would soon disappear, the sound head thus losing its character as a synchronizing instrument.

A suitable embodiment of the present invention is shown in detail in Figures 3 and 4. The sound head shaft 410 is journalled in a tubelike bearing 411 which in its turn is journalled in a bearing 412 which forms a part or is connected to the projector housing 10.

Part 411 also forms an inner bearing for the inner part 641 of a ball coupling 64 the outer part 642 of which is fastened to the sound head shaft 410.

Part 641 carries a gear which meshes with gear 63 fixed to shaft 620 carrying gear 62 meshing with worm gear 61 fixed on shaft 60.

This shaft 60 is driven by the motor 6 and turns over gears 61, 62, 63, 641 and the coupling 64 the sound head shaft 410. As it is well known the driving connection only exists as long as the inner part 641 of the coupling has a higher speed of rotation than the outer part 642. By this arrangement the sound head will be driven directly only in the first moment after the start of the projector, the coupling becoming inactive when the sound head has reached the speed of the filmstrip running over it. From this moment the sound head is driven only frictionally by the filmstrip itself.

Furthermore, the shaft 620 carries gear 621 meshing with gear 4110 fastened on the bearing 411, so that by turning shaft 620 part 411 also rotates.

The ratio of transmission between shaft 620 and either shaft 410 or bearing 411 is slightly different so that bearing 411 always turns a bit quicker than shaft 410.

As already stated the present invention which in the foregoing has been described only on one embodiment is not at all confined to talking motion projectors. The invention is equally applicable to sound reproducers only or to sound recording apparatus with or without connection to picture cameras. Furthermore, the invention may be used for recording, copying or reproducing sound-on-film regardless of the form in which the sound may be recorded and therefore refers as well to mechanical as to chemical, magnetical or other records placed on a strip which must be driven with highest uniformity of speed through the sound recording or reproducing apparatus.

Therefore what I claim as new and desire to secure by Letters Patent of the United States is:

1. In a device for recording sound on a film or reproducing sound from a sound film, a drum adapted to be driven by said film, a shaft on which said drum is secured, a rotatary bearing in which said shaft is rotatably supported, and means for rotating said bearing independently of said drum in the same direction in which said drum is driven by the film.

2. In a device for recording sound on a film or reproducing sound from a sound film, a driving mechanism for moving said film, a drum adapted to be driven by the moving film, a shaft on which said drum is secured, a rotatably mounted bearing in which said shaft is rotatably supported, means other than the film itself for coupling said shaft to the driving mechanism during starting and for releasing the said coupling automatically when the drum has attained a speed slightly less than the speed at which it is to be driven by the film, and means for rotating said bearing independently of said drum.

3. In a device for recording sound on a film or reproducing sound from a sound film, a driving mechanism for moving said film, a drum adapted to be driven by the moving film, a shaft on which said drum is secured, a rotatably mounted bearing in which said shaft is rotatably supported, means other than the film itself for coupling said shaft to the driving mechanism during starting and for releaseing the said coupling automatically when the drum has attained a speed slightly less than the speed at which it is to be driven by the film, and means for rotating said bearing independently of said drum, said means being continuously driven by said driving mechanism.

4. In a device for recording sound on a film or reproducing sound from a sound film, a driving mechanism for moving said film, a drum adapted to be driven by the moving film, a shaft on which said drum is secured, a rotatably mounted bearing in which said shaft is rotatably supported, means other than the film itself for coupling said shaft to the driving mechanism during starting and for releasing the said coupling automatically when the drum has attained a speed slightly less than the film, and means for rotating said bearing independently of said drum, said means being connected with said driving mechanism and being adapted to continuously rotate said bearing in the same direction in which the drum is driven by said film.

5. In a device for recording sound on a film or reproducing sound from a sound film, a driving mechanism for moving said film, a drum adapted to be driven by the moving film, a shaft on which said drum is secured, a rotatably mounted bearing in which said shaft is rotatably supported, means other than the film itself for coupling said shaft to the driving mechanism during starting and for releasing the said coupling automatically when the drum has attained a speed slightly less than the speed at which it is to be driven by the film, and means for rotating said bearing independently of said drum, at a speed varying from the speed at which the drum is driven by the film.

6. In a device for recording sound on a film or reproducing sound from a sound film, a driving mechanism for moving said film, a drum adapted to be driven by the moving film, a shaft on which said drum is secured, a rotatably mounted bearing in which said shaft is rotatably supported, means other than the film itself for coupling said shaft to the driving mechanism during starting and for releasing the said coupling automatically when the drum has attained a speed slightly less than the speed at which it is to be driven by the film, and means for rotating said bearing independently of said drum, at a speed slightly higher than the speed at which the drum is driven by the film.

7. In a device for recording sound on a film or reproducing sound from a sound film, a driving mechanism for moving said film, a drum adapted to be driven by the moving film, a shaft on which said drum is secured, a rotatably mounted bearing in which said shaft is rotatably supported, means other than the film itself for coupling said shaft to the driving mechanism during starting and for releasing the said coupling automatically when the drum has attained a speed slightly less than the speed at which it is to be driven by the film, and means for rotating said bearing independently of said drum, said means being connected with said driving mechanism and being adapted to continuously rotate said bearing in the same direction in which drum is driven by said film, and at a slightly higher speed than said drum.

8. In a device for recording sound on a film or reproducing sound from a sound film, a drum adapted to be driven by said film, a shaft on which said drum is secured, a rotatable bearing in which said shaft is rotatably supported, and means for rotating said bearing independently of said drum in the same direction in which said drum is driven by the film, at a speed varying from the speed of the drum.

9. In a device for recording sound on a film or reproducing sound from a sound film, a drum adapted to be driven by said film, a shaft on which said drum is secured, a rotatable bearing in which said shaft is rotatably supported, and means for rotating said bearing independently of said drum in the same direction in which said drum is driven by the film, at a speed slightly higher than the speed of the drum.

HERMANN JOACHIM.